US009624085B1

(12) United States Patent
Peckels

(10) Patent No.: US 9,624,085 B1
(45) Date of Patent: Apr. 18, 2017

(54) UNIMPEDED MEASURED POURER DEVICE

(71) Applicant: Arganius E Peckels, Ogilvie, MN (US)

(72) Inventor: Arganius E Peckels, Ogilvie, MN (US)

( * ) Notice: Subject to any disclaimer, the term of this patent is extended or adjusted under 35 U.S.C. 154(b) by 0 days.

(21) Appl. No.: 14/984,597

(22) Filed: Dec. 30, 2015

(51) Int. Cl.
| | |
|---|---|
| *B65D 47/06* | (2006.01) |
| *B65D 25/40* | (2006.01) |
| *B67D 3/00* | (2006.01) |
| *B67D 1/00* | (2006.01) |
| *G01F 11/10* | (2006.01) |
| *G01F 11/26* | (2006.01) |
| *G01F 13/00* | (2006.01) |
| *B65D 39/06* | (2006.01) |
| *G01F 11/32* | (2006.01) |
| *B65D 25/48* | (2006.01) |

(52) U.S. Cl.
CPC ......... *B67D 3/0041* (2013.01); *B67D 3/0051* (2013.01); *B65D 25/48* (2013.01); *B65D 39/06* (2013.01); *B65D 47/06* (2013.01); *B65D 2231/005* (2013.01); *B67D 3/0003* (2013.01); *B67D 2210/00144* (2013.01); *G01F 11/265* (2013.01); *G01F 11/32* (2013.01)

(58) Field of Classification Search
CPC ........ B65D 39/06; B65D 47/06; B65D 25/48; B65D 2231/005; B67D 3/0041; B67D 3/0051; B67D 3/0003; B67D 2210/00144; G01F 11/32; G01F 11/265
See application file for complete search history.

(56) References Cited

U.S. PATENT DOCUMENTS

| | | | | |
|---|---|---|---|---|
| 3,802,606 | A * | 4/1974 | Gust | B67D 3/0003 222/185.1 |
| 5,044,521 | A * | 9/1991 | Peckels | B67D 3/0051 215/329 |
| 5,097,991 | A * | 3/1992 | Lance | G01F 11/32 222/442 |
| 5,505,349 | A * | 4/1996 | Peckels | B67D 3/0041 222/36 |
| 5,603,430 | A * | 2/1997 | Loehrke | B67D 1/0888 222/1 |
| 5,702,032 | A * | 12/1997 | Loehrke | B67D 3/0006 222/63 |
| 5,961,008 | A * | 10/1999 | Peckels | B65D 39/06 222/477 |
| 6,036,055 | A * | 3/2000 | Mogadam | B67D 3/0006 222/1 |
| 6,354,468 | B1 * | 3/2002 | Riek | B67D 3/0051 222/129.3 |
| 6,409,046 | B1 * | 6/2002 | Peckels | B67D 3/0041 222/1 |
| 6,662,976 | B2 * | 12/2003 | Jensen | B67D 3/0003 222/442 |

(Continued)

Primary Examiner — Frederick C Nicolas
(74) Attorney, Agent, or Firm — Dave Alan Lingbeck

(57) ABSTRACT

An unimpeded pourer device for allowing unimpeded movement of the valve member in the bore of the tubular member. The unimpeded pourer device includes a pourer assembly adapted to be in fluid communication with a bottle and including a tubular member having a bore disposed therein, and also including a spout in fluid communication with the tubular member and having passageway extending therethrough in communication with the bore; and a valve assembly in communication with the pourer assembly for dispensing measured amounts of liquid through and from the pourer assembly.

6 Claims, 2 Drawing Sheets

(56) References Cited

U.S. PATENT DOCUMENTS

| | | | | |
|---|---|---|---|---|
| 8,251,262 B2* | 8/2012 | Peckels | ............... | B67D 3/0045 |
| | | | | 222/1 |
| 9,061,302 B1* | 6/2015 | Peckels | .................. | B05B 1/302 |
| 9,254,944 B1* | 2/2016 | Peckels | .................. | B65D 25/48 |
| 2005/0263547 A1* | 12/2005 | Jensen | ................ | B67D 3/0045 |
| | | | | 222/504 |
| 2009/0230157 A1* | 9/2009 | Lindberg | ............ | B67D 3/0041 |
| | | | | 222/504 |

* cited by examiner

UNIMPEDED MEASURED POURER DEVICE

BACKGROUND OF THE INVENTION

Field of the Invention

The present invention relates to pourers and more particularly pertains to a new unimpeded pourer device for allowing unimpeded movement of the valve member in the bore of the tubular member.

Description of the Prior Art

The use of pourers is known in the prior art. More specifically, pourers heretofore devised and utilized are known to consist basically of familiar, expected and obvious structural configurations, notwithstanding the myriad of designs encompassed by the crowded prior art which have been developed for the fulfillment of countless objectives and requirements.

The prior art includes pourers having tubular members with bores disposed therethrough and with ball valves movably disposed in the bores and with magnetic members positioned at the inlets of the bores to retain the ball valves. To make sure that the ball valves engage the magnetic members, the circumferences of the bores are proximately equivalent to the circumferences of the ball valves just large enough to allow the ball values to move within the bores. While these devices fulfill their respective, particular objectives and requirements, the aforementioned patents do not disclose a new unimpeded pourer device.

SUMMARY OF THE INVENTION

The general purpose of the present invention, which will be described subsequently in greater detail, is to provide a new unimpeded pourer device which has many of the advantages of the pourers mentioned heretofore and many novel features that result in a new unimpeded pourer device which is not anticipated, rendered obvious, suggested, or even implied by any of the prior art pourers, either alone or in any combination thereof. The present invention includes a pourer assembly adapted to be in fluid communication with a bottle and including a tubular member having a bore disposed therein, and also including a spout in fluid communication with the tubular member and having a passageway extending therethrough in communication with the bore; and a valve assembly in communication with the pourer assembly for dispensing measured amounts of liquid through and from the pourer assembly. None of the prior art includes the combination of the elements of the present invention.

There has thus been outlined, rather broadly, the more important features of the unimpeded pourer device in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new unimpeded pourer device which has many of the advantages of the pourers mentioned heretofore and many novel features that result in a new unimpeded pourer device which is not anticipated, rendered obvious, suggested, or even implied by any of the prior art pourers, either alone or in any combination thereof.

Still another object of the present invention is to provide a new unimpeded pourer device for allowing unimpeded movement of the ball valve in the bore of the tubular member.

Still yet another object of the present invention is to provide a new unimpeded pourer device that aligns the ball valve with the magnetic member inside the bore of the tubular member.

Even still another object of the present invention is to provide a new unimpeded pourer device that continues to work without interference after sediment such as that contained in wine is disposed in the bore.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
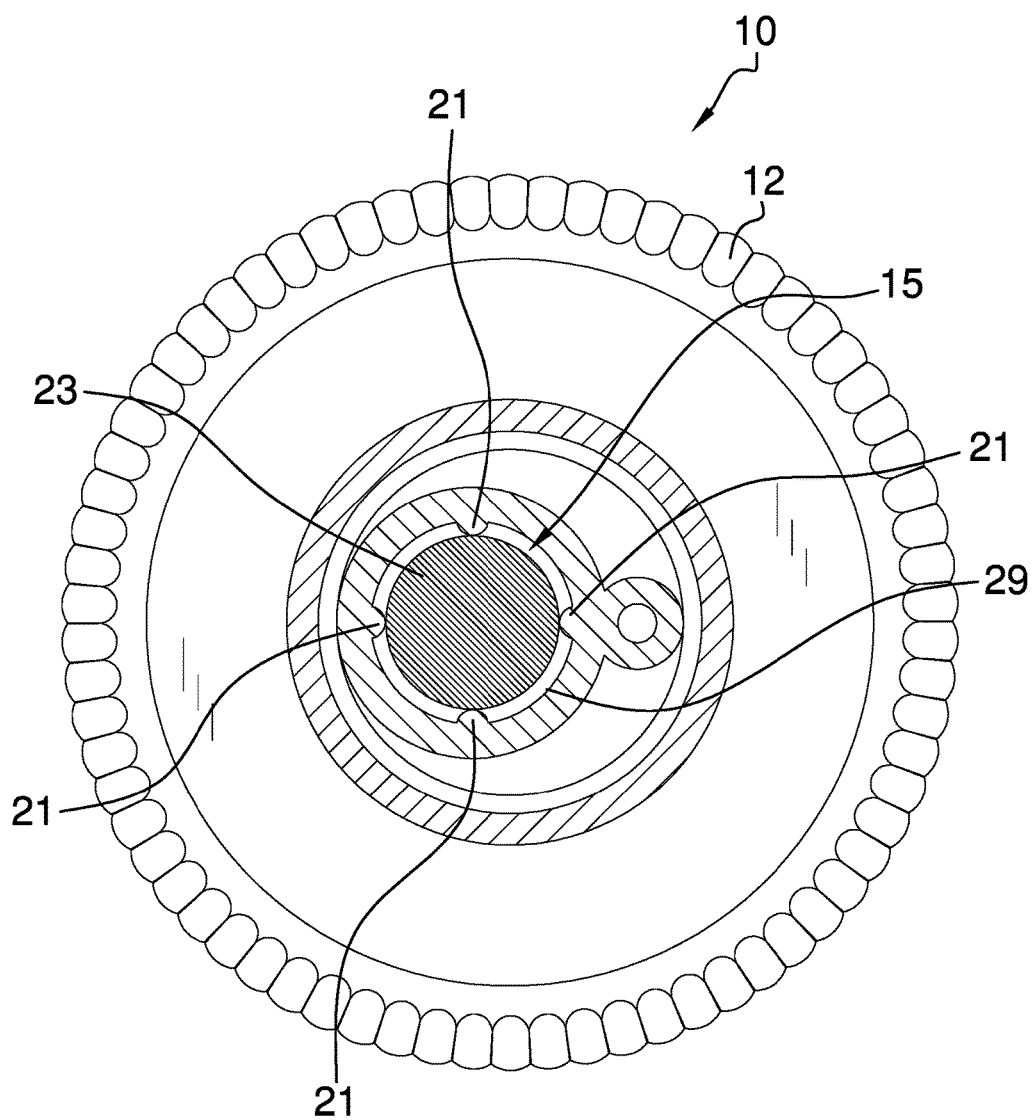
FIG. 1 is a bottom cross-sectional view of a new unimpeded pourer device according to the present invention.
Figure 2:
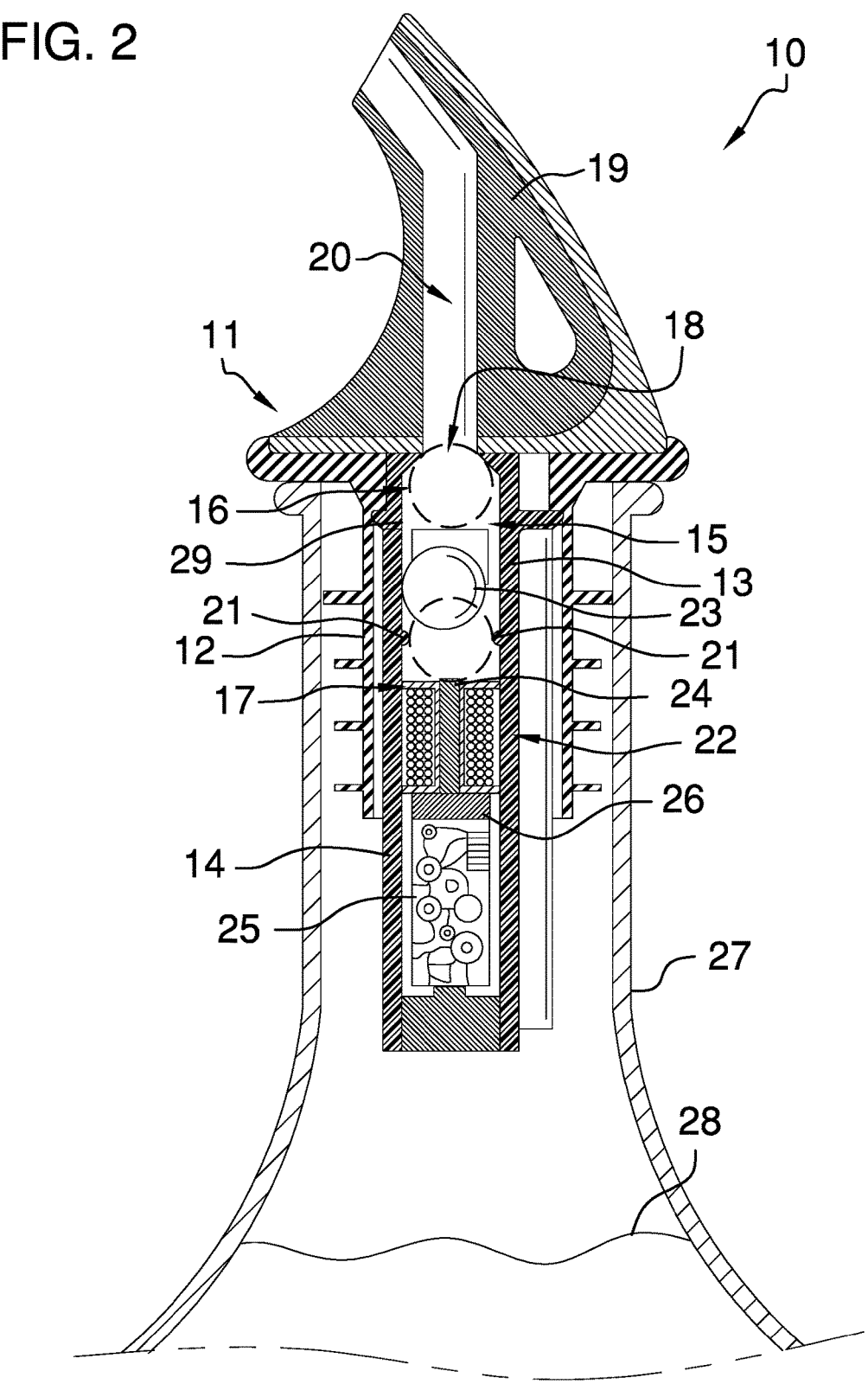
FIG. 2 is a side cross-sectional view of the present invention and a partial bottle with liquid.

With reference now to the drawings, and in particular to FIGS. 1 through 2 thereof, a new unimpeded pourer device embodying the principles and concepts of the present invention and generally designated by the reference numeral 10 will be described.

As best illustrated in FIGS. 1 through 2, the unimpeded pourer device 10 may generally comprise a pourer assembly 11 adapted to be in fluid communication with a bottle and including a tubular member 12 having a bore 15 disposed therein, and also including a spout 19 in fluid communication with the tubular member 12 and having a passageway 20 extending therethrough in communication with the bore 15 and may also comprise a valve assembly 22 in communication with the pourer assembly 11 for dispensing measured amounts of liquid 28 through and from the pourer assembly 11.

The tubular member 12 may have a back end portion 14 and a front end portion 13. The bore 15 may be disposed in the front end portion 13 and may have a front end 16 and a back end 17 with an outlet port 18 disposed through the front end 16 and into the passageway 20 of the spout 19. The valve assembly 22 may also include a valve member 23 movably disposed in the bore 15 and seatable in outlet port 18 to prevent dispensing of the liquid 28 through the passageway 20 of the spout 19. The valve assembly 22 may further include a programmable circuit board 25 conventionally disposed in the back end portion 14, and may also include a power source 26 such as a battery in conventional communication with the circuit board 25, and may further include a magnetizable valve retaining member 24 conventionally disposed at the back end 17 of the bore 15 and in conventional communication with the power source 26. The valve member 13 may be a ball 23 magnetically retainable to the valve retaining member 24 upon the valve retaining member 24 being magnetized by the power source 26. The circuit board 25 may be programmed to demagnetize the valve retaining member 24 after a selected amount of the liquid 28 is dispensed through the pourer assembly 11 with the ball 23 being released and moving within the bore 15 and seating into the outlet port 18 to prevent any more of the liquid 28 being dispensed through the pourer assembly 11.

The bore 15 may have a cross-sectional area measurably larger than a cross-sectional area of the ball 23 with there being a measurable space between the ball 23 and a side wall 29 of the bore 15 so that any sediment from the liquid 28 disposed in the bore won't impede movement of the ball 23 within the bore 15 and the ball 23 won't stick inside the bore 15 and thus not affect the amount of the liquid 28 being dispensed. The pourer assembly 11 may also include alignment members 21 conventionally disposed in the bore 15 and upon the side wall 29 of the bore 15 with a cross-sectional area between the alignment members 21 being approximate and substantially equivalent to the cross-sectional area of the ball 23 to align and center the ball 23 upon the valve retaining member 24. The alignment members 23 may be disposed proximate to the back end 17 of the bore 15 and spaced from the valve retaining member 24. The alignment members 21 may be spaced approximately one half of the cross sectional area of the ball 23 from the back end 17 of the bore 15 and the valve retaining member 24 to ensure that the ball 23 is aligned upon the valve retaining member 24. The alignment members 21 are nodes 21 integrally extending into the bore 15 and equally spaced about the bore 15 and having a rounded surface to allow the ball 23 to move therebetween and to align and center upon the valve retaining member 24.

In use, the pourer device 10 may be removably inserted in a neck of the bottle 27 containing the liquid 28, and the valve retaining member 24 may be energized by the power source 26 to retain the valve member 23 to the valve retaining member 24. The valve retaining member 24 may be magnetized to magnetically retain the valve member 23 to the valve retaining member 24. The liquid 28 may be decantered from the bottle 27 and the valve member 23 may be released to move unimpeded and without sticking inside the bore 15 of a tubular member 12 and seated into an outlet port 18 of the bore 15 after a selected amount of the liquid 28 is dispensed. The valve retaining member 24 may be demagnetized by the circuit board 25 to release the valve member 23 with the valve member 23 moving in the bore 15 and seating into the outlet port 18 to prevent further dispensing of the liquid 28 from the bottle 27. The valve retaining member 24 may then be re-energized by the power source 26 and the valve member 23 is aligned and centered on the valve retaining member 24. The valve member 23 may be gravitationally and freely moved without sticking inside the bore 15 upon the valve retaining member 24 between the alignment members 21 to align and magnetically secure the valve member 23 to the valve retaining member 24.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the unimpeded pourer device. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An unimpeded pourer device comprising:
   a pourer assembly adapted to be in fluid communication with a bottle and including a tubular member having a bore disposed therein, and also including a spout in fluid communication with the tubular member and having a passageway extending therethrough in communication with the bore, wherein the tubular member has a back end portion, wherein the bore has a back end and an outlet port disposed into the passageway of the spout; and
   a valve assembly in communication with the pourer assembly for dispensing measured amounts of liquid through and from the pourer assembly, wherein the valve assembly includes a valve member movably disposed in the bore and seatable in the outlet port to prevent dispensing of the liquid through the passageway of the spout, wherein the valve assembly also includes a programmable circuit board disposed in the back end portion, and further includes a power source in communication with the circuit board, and also includes a magnetizable valve retaining member disposed at the back end of the bore and in communication with the power source, wherein the valve member is a ball magnetically retainable to the valve retaining member upon the valve retaining member being magnetized by the power source, wherein the pourer assembly also includes alignment members disposed in the bore and upon the side wall of the bore with a cross-sectional area between the alignment members being approximate to the cross-sectional area of the ball to align and center the ball upon the valve retaining member.

2. The unimpeded pourer device as described in claim 1, wherein the alignment members are disposed proximate to the back end of the bore and spaced from the valve retaining member.

3. The unimpeded pourer device as described in claim 2, wherein the alignment members are spaced approximately one half of the cross-sectional area of the ball from the back end of the bore and from the valve retaining member to ensure that the ball is aligned upon the valve retaining member.

4. The unimpeded pourer device as described in claim 1, wherein the alignment members are nodes extending into the bore and equally spaced about the bore and having a rounded outer surface to allow the ball to move therebetween and to align and center upon the valve retaining member.

5. A method of using an unimpeded pourer device comprising:

inserting the pourer device in a bottle containing liquid;

energizing a valve retaining member to retain a valve member to the valve retaining member;

decantering the liquid from the bottle and releasing the valve member to move unimpeded and without sticking inside a bore of a tubular member and seat into an outlet port of the bore after a selected amount of the liquid is dispensed;

re-energizing the valve retaining member; and aligning and centering the valve member on the valve retaining member and providing alignment members in the bore and attached to a side wall of the bore proximate to the valve retaining member with a cross-sectional area between the alignment members being approximate to a cross-sectional area of the valve member.

6. The method of using an unimpeded pourer device as described in claim 5 including gravitationally and freely moving the valve member without sticking inside the bore upon the valve retaining member between the alignment members to align and magnetically secure the valve member to the valve retaining member.

* * * * *